E. C. AUSTIN.
NUT LOCK.
APPLICATION FILED MAR. 26, 1920.

1,358,496. Patented Nov. 9, 1920.

Witness:
Chr. C. Olson

Inventor:
Ernest C. Austin,
By Rummler & Rummler,
Attys.

UNITED STATES PATENT OFFICE.

ERNEST C. AUSTIN, OF BERKELEY, CALIFORNIA.

NUT-LOCK.

1,358,496. Specification of Letters Patent. Patented Nov. 9, 1920.

Application filed March 26, 1920. Serial No. 368,872.

*To all whom it may concern:*

Be it known that I, ERNEST C. AUSTIN, a subject of the King of Great Britain, and a resident of Berkeley, county of Alameda, and State of California, have invented certain new and useful Improvements in Nut-Locks, of which the following is a specification.

The main objects of this invention are to provide an efficient and inexpensive nut-lock which will not mutilate the nut or the work to which it is applied; and to provide an improved form and arrangement of the parts of the lock whereby the device may be used repeatedly without impairing its efficiency.

An illustrative embodiment of this invention is shown in the accompanying drawings, in which—

Figure 1:
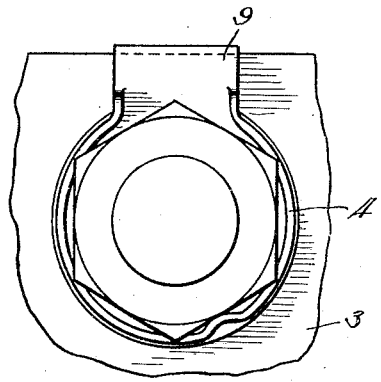
Figure 1 is a plan of the nut-lock secured between a nut and the work to which it is applied.

The improved nut-lock shown in the drawings comprises a cup-shaped washer 2 adapted for insertion between the nut 1 and the work 3 secured thereby and having an upstanding rim or flange 4 extending substantially around the periphery of the lock and by which it is supported on the nut.

The nut 1 is preferably of the same type as that shown in my copending application, Serial No. 337,775, filed November 13, 1919, having notches 5 cut into the corners 6 thereof adjacent the bottom face. The notches, which are of a depth substantially equal to the thickness of the flange on the washer, are cut so as to form a shoulder 7 inclined axially inward. Below the shoulder 7 the nut is cut away on an axial incline to provide tapered approaches 8, which enable the cup-washer to be easily snapped into place since the flange 4 is guided by the tapered approaches into position in the notches 5. The nut 1 is seated in the cup-shaped washer and the upstanding flange 4 is bent inwardly to engage the inclined shoulders 7 of the notches 5 so as to support the lock on the nut while still permitting the relative rotation thereof. When the invention is applied to a cap screw, the lock may be secured to the cap screw head in the same manner. The washer is preferably made of soft material in order that the flange may be readily bent inwardly at any convenient point to bear against one side of the nut as shown in Fig. 1.

Figure 4:
Fig. 4 is a vertical section of the same.

The body of the washer may be dished to a concavo-convex form as shown in Fig. 4, the convex face being opposed to the nut so that the nut rests only upon the inner edge of the lock. The friction between the nut and lock being thereby greatly reduced, the nut may be screwed down onto the work without effecting any rotation of the washer. A lug 9 extends radially outward from the periphery of the washer and is bendable into and out of position for engaging one of the side edges of the work 3.

Figure 2:
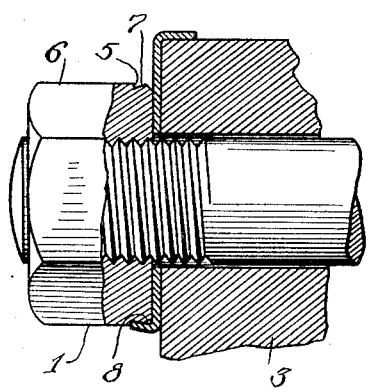
Fig. 2 is a fragmentary view partly in section of the same.
Figure 3:
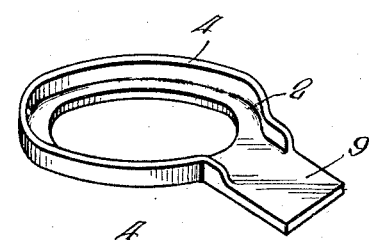
Fig. 3 is a perspective view of the nut-lock.

In operation the nut 1 carrying the lock is screwed down tightly onto the work 3. The peripheral flange 4 may then by a light tap thereon be bent inwardly at any convenient point or points, so as to bear against a flat side of the nut, and the lug 9 may be bent downwardly to engage a side edge of the work 3, as shown in Fig. 2. To loosen the nut, power is applied with a wrench in the usual way. The rotation of the nut will cause the corners thereof to roll the flattened portion of the flange 4 back to its normal position.

It is of course not essential that the locking washer be attached permanently to the nut by bending the flange into the grooves on the nut but this is a convenience since it enables the nuts and washers of proper sizes to be assembled and obviates the necessity of having the user put to the trouble of matching them.

Although but one specific embodiment of this invention has been herein shown and described, it will be understood that certain details of the construction shown may be altered or omitted without departing from the spirit of this invention as defined by the following claims.

I claim:

1. A nut-lock in combination with a nut having shoulders formed on the sides thereof, said nut-lock comprising a concavo-convex washer having a lug extending radially outward from the periphery thereof, said lug being bendable into and out of position to engage one of the side edges of the work to which said nut-lock is applied, and a flange on the convex face of said washer coacting with said shoulders for supporting said lock on said nut so as to permit a relative rotation thereof, said flange being adapted to be bent to coact with a flat side of said nut so as to secure said nut and lock against relative rotation.

2. A nut-lock comprising a sheet metal washer for insertion between a nut and the part which is held thereby, a peripheral upstanding flange on said washer bendable into and out of position at any point in its length to engage a flat side of the nut and a lug projecting outwardly from the washer to engage with a rotation preventing portion of said part.

3. A nut-lock comprising a washer having a lug extending outwardly from the periphery thereof to engage with a rotation preventing part of the work to which the nut-lock is applied, a flange on said washer extending along the periphery thereof and out along the edges of the lug adjacent the washer to strengthen the joint between the lug and the washer, said flange being bendable inwardly against a facet of the nut to prevent rotation thereof.

Signed at Berkeley this 10th day of March, 1920.

ERNEST C. AUSTIN.